United States Patent
Parmar et al.

(10) Patent No.: US 8,156,174 B2
(45) Date of Patent: Apr. 10, 2012

(54) METHOD AND SYSTEM FOR INFORMATION EXCHANGE UTILIZING AN ASYNCHRONOUS PERSISTENT STORE PROTOCOL

(75) Inventors: Onkar S. Parmar, Markham (CA); Yonggang Hu, Richmond Hill (CA)

(73) Assignee: Platform Computing Corporation, Markham, Ontario (CA)

( * ) Notice: Subject to any disclaimer, the term of this patent is extended or adjusted under 35 U.S.C. 154(b) by 303 days.

(21) Appl. No.: 11/735,125

(22) Filed: Apr. 13, 2007

(65) Prior Publication Data

US 2008/0256245 A1  Oct. 16, 2008

(51) Int. Cl.
*G06F 15/16* (2006.01)
*G06F 3/00* (2006.01)

(52) U.S. Cl. .................... 709/202; 719/317

(58) Field of Classification Search .............. 707/2, 3, 707/8, 10, 202; 709/203, 216, 219, 223, 709/224, 228, 229, 232, 242, 202; 713/152, 713/165, 193, 323, 340; 719/312, 313, 314, 719/328, 317; 726/3, 627; 710/7, 20, 21, 710/36, 52, 74; 711/100
See application file for complete search history.

(56) References Cited

U.S. PATENT DOCUMENTS

| | | | | |
|---|---|---|---|---|
| 6,088,796 | A * | 7/2000 | Cianfrocca et al. | 713/152 |
| 6,178,464 | B1 * | 1/2001 | Knight et al. | 719/328 |
| 7,020,697 | B1 * | 3/2006 | Goodman et al. | 709/223 |
| 7,194,761 | B1 * | 3/2007 | Champagne | 726/6 |
| 7,447,743 | B1 * | 11/2008 | Jordan, Jr. | 709/206 |
| 2001/0018703 | A1 * | 8/2001 | Miyazawa et al. | 709/203 |
| 2002/0161859 | A1 * | 10/2002 | Willcox et al. | 709/219 |
| 2003/0131068 | A1 * | 7/2003 | Hoshino et al. | 709/216 |
| 2004/0120293 | A1 * | 6/2004 | Hassan et al. | 370/338 |
| 2004/0230830 | A1 * | 11/2004 | Ogawa et al. | 713/200 |
| 2004/0236732 | A1 * | 11/2004 | Ruellan et al. | 707/3 |
| 2006/0026347 | A1 * | 2/2006 | Hung | 711/114 |
| 2008/0104259 | A1 * | 5/2008 | LeFevre et al. | 709/228 |

* cited by examiner

*Primary Examiner* — Lynn Feild
*Assistant Examiner* — Jonathan Willis
(74) *Attorney, Agent, or Firm* — Baker & McKenzie LLP

(57) ABSTRACT

Disclosed herein are embodiments of a method and system for facilitating the exchange of information between interconnected processors in environments requiring high performance and high reliability. In an exemplary embodiment, the source sends input to the target and expects output from the target in return. A manager in communication with both the source and the target receives and initiates a storage of the information in nonvolatile memory. The manager concurrently forwards the information to its proper destination. If the manager receives output from the target before completion of the input storage, the manager cancels the input storage because it is no longer needed to ensure system reliability. If the manager receives acknowledgement from the source that the target output has been received before completion of the output storage, the manager cancels the output storage because it is no longer needed to ensure system reliability. Related embodiments are also described.

28 Claims, 3 Drawing Sheets

METHOD AND SYSTEM FOR INFORMATION EXCHANGE UTILIZING AN ASYNCHRONOUS PERSISTENT STORE PROTOCOL

TECHNICAL FIELD

The present disclosure generally relates to methods and systems for facilitating the exchange of information between communicating entities and specifically relates to methods and systems for facilitating the exchange of information between interconnected processors in environments requiring high performance and high reliability, such as distributed computing environments and message-oriented middleware environments.

BACKGROUND

Users of distributed computing environments, message-oriented middleware environments, and other computer processes wherein information is exchanged between communicating entities continue to demand higher performance without sacrificing process reliability. For example, a user of a distributed computing environment, wherein a client sends out workload and expects results, may require a 5 ms or less round trip workload latency in an environment with thousands of compute nodes and clients. In the traditional store-and-forward approach, a server receives the client's workload and forwards the workload to compute nodes in the distributed computing environment. But before forwarding the workload, the server stores the workload in nonvolatile memory and sends an acknowledgement to the client. User performance requirements, however, are often unattainable with the traditional store-and-forward approach because the total system performance can never exceed the maximum performance of the storage operation. Because the storage operation is often the lowest performing operation in the system, a new approach is needed to meet higher performance and reliability requirements.

BRIEF SUMMARY

Disclosed herein are embodiments of a method and system for facilitating the exchange of information between interconnected processors, specifically a source and a target, in environments requiring high performance and high reliability, such as distributed computing environments and message-oriented middleware environments. In an exemplary embodiment, the source sends input to the target and expects output from the target in return. A manager in communication with both the source and the target receives the input from the source and initiates a storage of the input in nonvolatile memory. Rather than wait for completion of the initiated storage, the manager concurrently forwards the input to the target. If the manager receives output from the target before completion of the input storage, the manager cancels the input storage because it is no longer needed to ensure system reliability. Upon receiving output from the target, the manager initiates a storage of the output in nonvolatile memory. Rather than wait for completion of the initiated storage, the manager concurrently forwards the output to the source. If the manager receives acknowledgement from the source that the target output has been received before completion of the output storage, the manager cancels the output storage because it is no longer needed to ensure system reliability.

DETAILED DESCRIPTION

Various aspects of a method and system for facilitating the exchange of information between communicating entities utilizing an asynchronous persistent store protocol according to the present disclosure are described. It is to be understood, however, that the following explanation is merely exemplary in describing aspects of the present disclosure.

Figure 1:
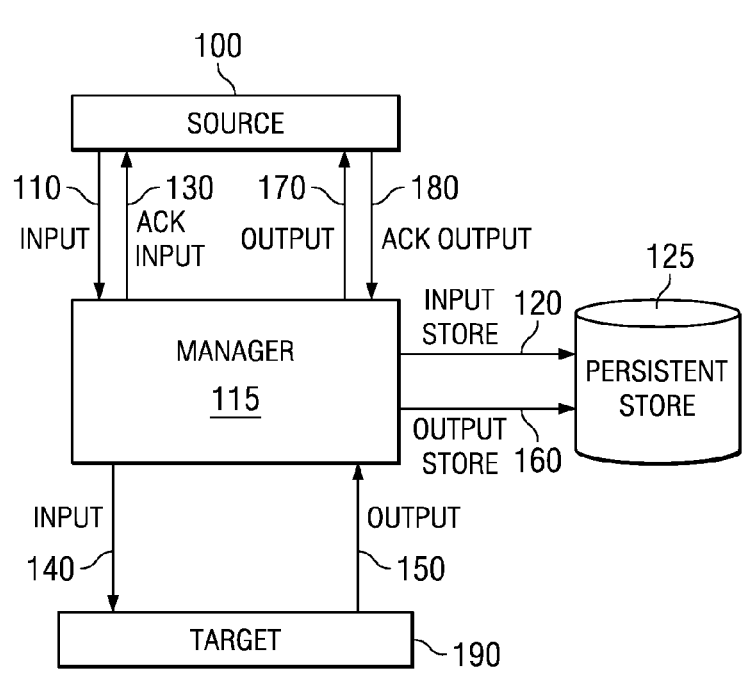
FIG. 1 is a block diagram depicting a prior art system for facilitating the exchange of information between communicating entities.

FIG. 1 is a block diagram depicting a prior art system for facilitating the exchange of information between a source and a target, wherein the source sends input to the target and expects output from the target in return. In this system, source 100 communicates with target 190 over a communications pathway, such as an electrical circuit or a telecommunications network. Source 100 sends input 110 to target 190 and expects output 170 from target 190 in return. Manager 115, in communication with both source 100 and target 190, receives input 110 from source 100. To ensure reliability should manager 115 experience a failure during the communication cycle, manager 115 stores input 120 received from source 100 in persistent store 125. Once the input has been reliably stored, manager 115 acknowledges 130 to source 100 that the input has been received. Should manager 115 experience a failure at this point, manager 115 can retrieve the stored input from persistent store 125 and continue the process in a manner that is transparent to source 100.

After storing the input received from source 100, manager 115 forwards input 140 to target 190. Once target 190 has received the input and performed any required processing, manager 115 receives output 150 from target 190. To ensure reliability should manager 115 experience a failure during the communication cycle, manager 115 stores output 160 received from target 190 in persistent store 125. Once the output has been reliably stored, should manager 115 experience a failure, manager 115 can retrieve the stored output from persistent store 125 and continue the process in a manner that is transparent to both source 100 and target 190. After storing the output received from target 190, manager 115 forwards output 170 to source 100. Once manager 115 receives acknowledgement 180 from source 100 that source 100 has received the target output, the communications cycle is complete.

Figure 2:
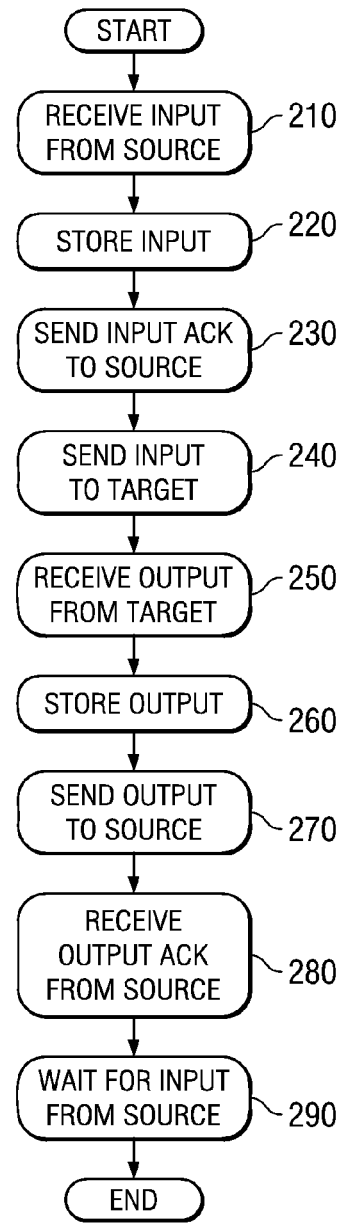
FIG. 2 is an activity diagram depicting a prior art process for facilitating the exchange of information between communicating entities.

FIG. 2 is an activity diagram depicting a prior art process for facilitating the exchange of information between a source and a target, wherein the source sends input to the target and expects output from the target in return. In this process, a manager in communication with both the source and the target receives 210 input from the source. To ensure reliability should the manager experience a failure during the communication cycle, the manager stores 220 the input received from the source in nonvolatile memory. Once the input has been reliably stored, the manager acknowledges 230 to the source that the input has been received. Should the manager experience a failure at this point, the manager can retrieve the stored input and continue the process in a manner that is transparent to the source.

After storing the input received from the source, the manager forwards 240 the input to the target. Once the target has received the input and performed any required processing, the manager receives 250 output from the target. To ensure reliability should the manager experience a failure during the communication cycle, the manager stores 260 the output received from the target in nonvolatile memory. Once the output has been reliably stored, should the manager experience a failure, the manager can retrieve the stored output and continue the process in a manner that is transparent to both the source and the target. After storing the output received from the target, the manager forwards 270 the output to the source. Once the manager receives acknowledgement 280 from the source that the source has received the target output, the communications cycle is complete and the manager waits 290 for further input from the source.

Figure 3:
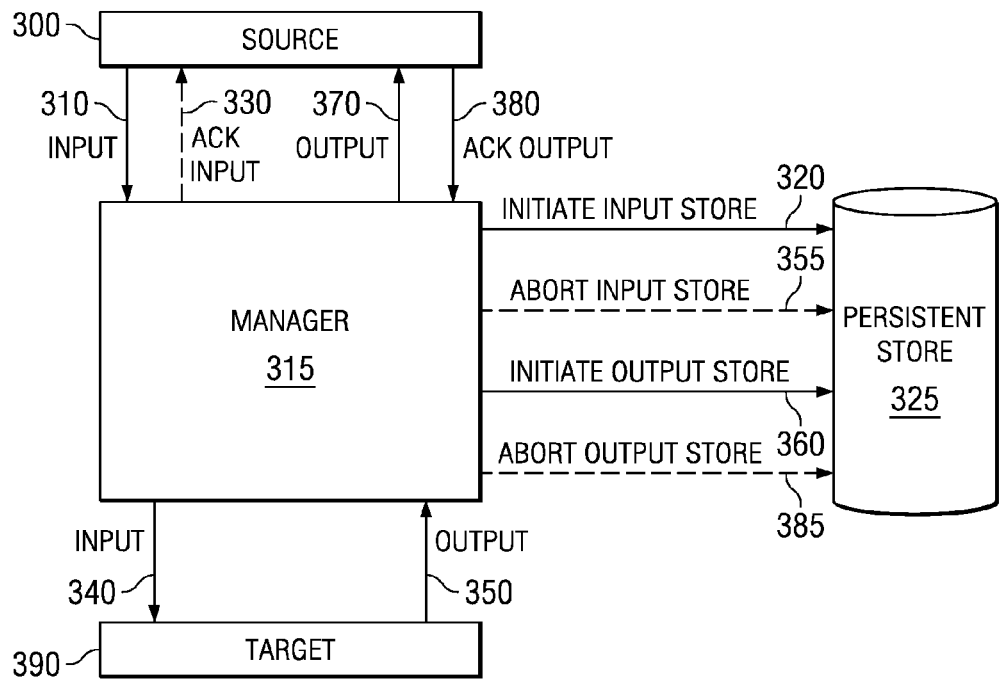
FIG. 3 is a block diagram depicting a representative system for facilitating the exchange of information between communicating entities utilizing an asynchronous persistent store protocol.

FIG. 3 is a block diagram depicting a new system for facilitating the exchange of information between a source and a target, wherein the source sends input to the target and expects output from the target in return. In this embodiment, source 300 communicates with target 390 over a communications pathway, such as an electrical circuit or a telecommunications network. Source 300 sends input 310 to target 390 and expects output 370 from target 390 in return. Manager 315, in communication with both source 300 and target 390, receives input 310 from source 300. To ensure reliability should manager 315 or source 300 experience a failure during the communication cycle, manager 315 initiates a storage 320 of the input received from source 300 in persistent store 325. Rather than wait for completion of the initiated input storage, manager 315 immediately forwards input 340 to target 390. Alternatively, manager 315 may forward input 340 simultaneously with initiating the storage 320 or manager 315 may forward input 340 before initiating the storage 320.

In this embodiment, once target 390 has received the input and performed any required processing, manager 315 receives output 350 from target 390. To ensure reliability should manager 315 or source 300 experience a failure during the communication cycle, manager 315 initiates a storage 360 of the output received from target 390 in persistent store 325. Rather than wait for completion of the initiated output storage, manager 315 immediately forwards output 370 to source 300. Alternatively, manager 315 may forward output 370 simultaneously with initiating the storage 360 or manager 315 may forward output 370 before initiating the storage 360. Once manager 315 receives acknowledgement 380 from source 300 that source 300 has received the target output, the communications cycle is complete.

In an alternative embodiment not depicted in FIG. 3, once target 390 has received the input and performed any required processing, source 300 receives output 350 from target 390.

When previously initiated input storage 320 completes and the input has been reliably stored, manager 315 acknowledges 330 to source 300 that the input has been received. Should source 300 experience a failure at this point, source 300 need not resend input 310 after recovery and manager 315 can continue the process despite the failure of source 300. Should manager 315 experience a failure at this point, manager 315 can retrieve the stored input from persistent store 325 and continue the process in a manner that is transparent to source 300. Reception of output 350 from target 390 before completion of the previously initiated input storage 320 obviates the need for storage of the input; consequently, manager 315 in this instance can abort 355 the input storage.

When previously initiated output storage 360 completes and the output has been reliably stored, should manager 315 experience a failure, manager 315 can retrieve the stored output from persistent store 325 and continue the process in a manner that is transparent to both source 300 and target 390. Should source 300 experience a failure after receiving output 370 but before sending output acknowledgement 380, manager 315 can again provide output 370 to source 300 by either retrieving the stored output from persistent store 325 or by resending input 340 to target 390. Reception of output acknowledgement 380 from source 300 before completion of the previously initiated output storage 360 obviates the need for storage of the output; consequently, manager 315 in this instance can abort 385 the output storage.

One embodiment of the system described by FIG. 3 takes place in a message-oriented middleware environment. In this embodiment, source 300 is a requesting client, target 390 is a responding client, manager 315 is a message transfer agent, input 310 is a request, and output 350 is a response. Requesting client 300 communicates with responding client 390 over a telecommunications network such as the Internet or a local area network. Requesting client 300 sends request 310 to responding client 390 and expects response 370 from responding client 390 in return. Message transfer agent 315, in communication with both requesting client 300 and responding client 390, receives request 310 from requesting client 300. To ensure reliability should message transfer agent 315 or requesting client 300 experience a failure during the communication cycle, message transfer agent 315 initiates a storage 320 of the request received from requesting client 300 in persistent store 325. Rather than wait for completion of the initiated request storage, message transfer agent 315 immediately forwards request 340 to responding client 390. Alternatively, message transfer agent 315 may forward request 340 simultaneously with initiating the storage 320 or message transfer agent 315 may forward request 340 before initiating the storage 320.

Message transfer agent 315 then receives response 350 from responding client 390. To ensure reliability should message transfer agent 315 or requesting client 300 experience a failure during the communication cycle, message transfer agent 315 initiates a storage 360 of the response received from responding client 390 in persistent store 325. Rather than wait for completion of the initiated response storage, message transfer agent 315 immediately forwards response 370 to requesting client 300. Alternatively, message transfer agent 315 may forward response 370 simultaneously with initiating the storage 360 or message transfer agent 315 may forward output 370 before initiating the storage 360. Once message transfer agent 315 receives acknowledgement 380 from requesting client 300 that requesting client 300 has received the responding client response, the communications cycle is complete.

When previously initiated request storage 320 completes and the request has been reliably stored, message transfer agent 315 acknowledges 330 to requesting client 300 that the request has been received. Should requesting client 300 experience a failure at this point, requesting client 300 need not resend request 310 after recovery and message transfer agent 315 can continue the process despite the failure of requesting client 300. Should message transfer agent 315 experience a failure at this point, message transfer agent 315 can retrieve the stored request from persistent store 325 and continue the process in a manner that is transparent to requesting client 300. Reception of response 350 from responding client 390 before completion of the previously initiated request storage 320 obviates the need for storage of the request; consequently, message transfer agent 315 in this instance can abort 355 the request storage.

When previously initiated response storage 360 completes and the response has been reliably stored, should message transfer agent 315 experience a failure, message transfer agent 315 can retrieve the stored response from persistent store 325 and continue the process in a manner that is transparent to both requesting client 300 and responding client 390. Should requesting client 300 experience a failure after receiving response 370 but before sending response acknowledgement 380, message transfer agent 315 can again provide response 370 to requesting client 300 by either retrieving the stored response from persistent store 325 or by resending request 340 to responding client 390. Reception of response acknowledgement 380 from requesting client 300 before completion of the previously initiated response storage 360 obviates the need for storage of the response; consequently, message transfer agent 315 in this instance can abort 385 the response storage.

Another embodiment of the system described by FIG. 3 takes place in a distributed computing environment. In this embodiment, source 300 is a client, target 390 is a compute node, manager 315 is a workload manager, input 310 is a workload unit, and output 350 is a result. Client 300 communicates with compute node 390 over a telecommunications network such as the Internet or a local area network. Client 300 sends workload unit 310 to compute node 390 and expects result 370 from compute node 390 in return. Workload manager 315, in communication with both client 300 and compute node 390, receives workload unit 310 from client 300. To ensure reliability should workload manager 315 or client 300 experience a failure during the communication cycle, workload manager 315 initiates a storage 320 of the workload unit received from client 300 in persistent store 325. Rather than wait for completion of the initiated workload unit storage, workload manager 315 immediately forwards workload unit 340 to compute node 390. Alternatively, workload manager 315 may forward workload unit 340 simultaneously with initiating the storage 320 or workload manager 315 may forward workload unit 340 before initiating the storage 320.

In this embodiment, workload manager 315 then receives result 350 from compute node 390. To ensure reliability should workload manager 315 or client 300 experience a failure during the communication cycle, workload manager 315 initiates a storage 360 of the result received from compute node 390 in persistent store 325. Rather than wait for completion of the initiated result storage, workload manager 315 immediately forwards result 370 to client 300. Alternatively, workload manager 315 may forward result 370 simultaneously with initiating the storage 360 or workload manager 315 may forward result 370 before initiating the storage 360. Once workload manager 315 receives acknowledgement 380 from client 300 that client 300 has received the compute node result, the communications cycle is complete.

In an alternative embodiment not depicted in FIG. 3, client 300 receives result 350 from compute node 390.

When previously initiated workload unit storage 320 completes and the workload unit has been reliably stored, workload manager 315 acknowledges 330 to client 300 that the workload unit has been received. Should client 300 experience a failure at this point, client 300 need not resend workload unit 310 after recovery and workload manager 315 can continue the process despite the failure of client 300. Should workload manager 315 experience a failure at this point, workload manager 315 can retrieve the stored workload unit from persistent store 325 and continue the process in a manner that is transparent to client 300. Reception of result 350 from compute node 390 before completion of the previously initiated workload unit storage 320 obviates the need for storage of the workload unit; consequently, workload manager 315 in this instance can abort 355 the workload unit storage.

When previously initiated result storage 360 completes and the result has been reliably stored, should workload manager 315 experience a failure, workload manager 315 can retrieve the stored result from persistent store 325 and continue the process in a manner that is transparent to both client 300 and compute node 390. Should client 300 experience a failure after receiving result 370 but before sending result acknowledgement 380, workload manager 315 can again provide result 370 to client 300 by either retrieving the stored result from persistent store 325 or by resending workload unit 340 to compute node 390. Reception of result acknowledgement 380 from client 300 before completion of the previously initiated result storage 360 obviates the need for storage of the result; consequently, workload manager 315 in this instance can abort 385 the result storage.

Figure 4:
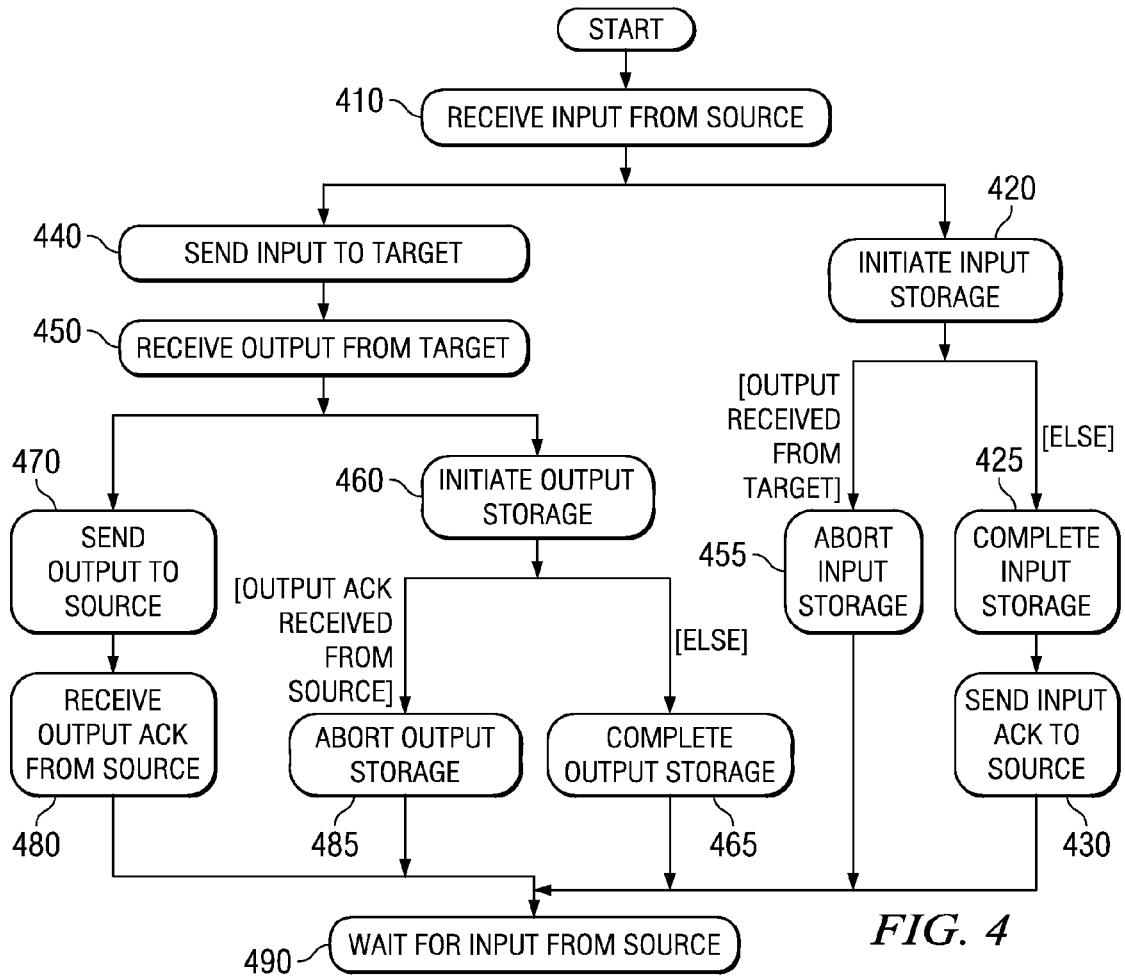
FIG. 4 is an activity diagram depicting a representative process for facilitating the exchange of information between communicating entities utilizing an asynchronous persistent store protocol.

FIG. 4 is an activity diagram depicting a new process for facilitating the exchange of information between a source and a target, wherein the source sends input to the target and expects output from the target in return. In this exemplary embodiment, a manager in communication with both the source and the target receives 410 input from the source. To ensure reliability should the manager or the source experience a failure during the communication cycle, the manager initiates 420 a storage in nonvolatile memory of the input received from the source. Rather than wait for completion of the initiated input storage, the manager immediately forwards 440 the input to the target. Alternatively, the manager may forward 440 the input simultaneously with initiating 420 the storage or the manager may forward 440 the input before initiating 420 the storage.

In this embodiment, once the target has received the input and performed any required processing, the manager receives 450 output from the target. To ensure reliability should the manager or the source experience a failure during the communication cycle, the manager initiates 460 a storage in nonvolatile memory of the output received from the target. Rather than wait for completion of the initiated output storage, the manager immediately forwards 470 the output to the source. Alternatively, the manager may forward 470 the output simultaneously with initiating 460 the storage or the manager may forward 470 the output before initiating 460 the storage. Once the manager receives acknowledgement 480 from the source that the source has received the target output, the communications cycle is complete and the manager waits 490 for further input from the source.

In an alternative embodiment not depicted in FIG. 4, once the target has received the input and performed any required processing, the source receives output from the target.

When the input storage previously initiated 420 completes 425 and the input has been reliably stored, the manager acknowledges 430 to the source that the input has been received. Should the source experience a failure at this point, the source need not resend the input after recovery and the manager can continue the process despite the failure of the source. Should the manager experience a failure at this point, the manager can retrieve the stored input and continue the process in a manner that is transparent to the source. Reception 450 of the output from the target before completion of the input storage previously initiated 420 obviates the need for storage of the input; consequently, the manager in this instance can abort 455 the input storage.

When the output storage previously initiated 460 completes 465 and the output has been reliably stored, should the manager experience a failure, the manager can retrieve the stored output and continue the process in a manner that is transparent to both the source and the target. Should the source experience a failure after receiving the output but before sending the output acknowledgement, the manager can again provide the output to the source by either retrieving the stored output from the persistent store or by resending the input to the target. Reception 480 of the output acknowledgement from the source before completion of the output storage previously initiated 460 obviates the need for storage of the output; consequently, the manager in this instance can abort 485 the output storage.

Figure 5:
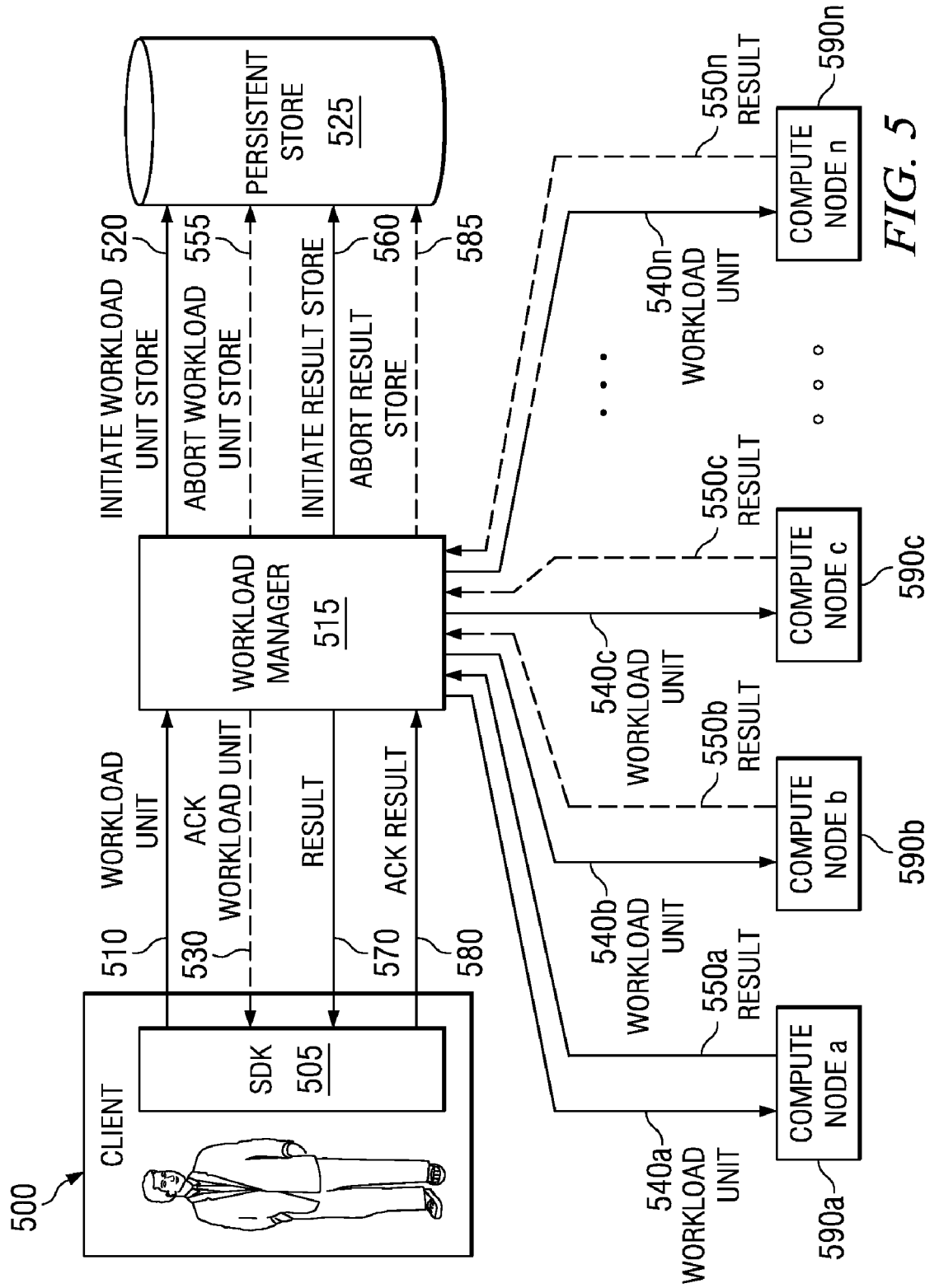
FIG. 5 is a block diagram depicting a representative system for facilitating the exchange of information between a client and multiple compute nodes in a distributed computing environment utilizing an asynchronous persistent store protocol.

A preferred embodiment of the present disclosure is shown in FIG. 5, which is a block diagram depicting a representative system for facilitating the exchange of information between client 500 and multiple compute nodes 590*a*-590*n* in a distributed computing environment. In this system, client 500 comprises a client Software Development Kit (SDK) 505. Client 500 communicates through client SDK 505 with multiple compute nodes 590*a*-590*n* over a telecommunications network such as the Internet or a local area network. In the distributed computing environment, client 500 sends out workload unit 510 for processing and expects result 570 in return. Workload manager 515, in communication with both client 500 and multiple compute nodes 590*a*-590*n*, receives workload unit 510 from client 500 and determines which compute node or nodes will receive workload unit 510. This determination may be based on the physical location of the compute nodes, on the availability of the compute nodes, on the capabilities of the compute nodes, or on some other criteria. In some cases only one compute node will be selected to receive workload unit 510, while in other cases more than one compute node will be selected to receive workload unit 510.

To ensure reliability should workload manager 515 or client 500 experience a failure during the communication cycle, workload manager 515 initiates a storage 520 of the workload unit received from client 500 in persistent store 525. Rather than wait for completion of the initiated workload unit storage, workload manager 515 immediately forwards workload units 540*a*-540*n*, duplicates of workload unit 510, to selected compute nodes 590*a*-590*n*. Alternatively, workload manager 515 may forward workload units 540*a*-540*n* simultaneously with initiating the storage 520 or workload manager 515 may forward workload units 540*a*-540*n* before initiating the storage 520. Workload manager 515 then receives result 550*a* from compute node 590*a*, the first compute node to complete the processing of the workload unit. In some embodiments, once workload manager 515 receives result 550*a* from compute node 590*a*, workload manager 515 may cancel processing of the workload unit on the remaining compute nodes. In other embodiments, workload manager 515 may ignore all results received after first result 550*a* is received or take some other action.

To ensure reliability should workload manager 515 or client 500 experience a failure during the communication cycle, workload manager 515 initiates a storage 560 of the result received from compute node 590*a* in persistent store 525. Rather than wait for completion of the initiated result storage, workload manager 515 immediately forwards result 570 to client 500. Alternatively, workload manager 515 may forward result 570 simultaneously with initiating the storage 560 or workload manager 515 may forward result 570 before initiating the storage 560. Once workload manager 515 receives acknowledgement 580 from client 500 that client 500 has received the compute node result, the communications cycle is complete.

When previously initiated workload unit storage 520 completes and the workload unit has been reliably stored, workload manager 515 acknowledges 530 to client 500 that the workload unit has been received. Should client 500 experience a failure at this point, client 500 need not resend workload unit 510 after recovery and workload manager 515 can continue the process despite the failure of client 500. Should workload manager 515 experience a failure before persisting the workload unit, client SDK 505 will reconnect to workload manager 515 upon recovery and resend the workload unit to workload manager 515. Should workload manager 515 experience a failure after persisting the workload unit, workload manager 515 can retrieve the stored workload unit from persistent store 525 and continue the process in a manner that is transparent to client 500, including resending the workload unit to selected compute nodes 590*a*-590*n* if necessary. Reception of result 550*a* from compute node 590*a* before completion of the previously initiated workload unit storage 520 obviates the need for storage of the workload unit; consequently, workload manager 515 in this instance can abort 555 the workload unit storage.

When previously initiated result storage 560 completes and the result has been reliably stored, should workload manager 515 experience a failure, workload manager 515 can retrieve the stored result from persistent store 525 and continue the process in a manner that is transparent to both client 500 and compute nodes 590*a*-590*n*. Should client 500 experience a failure after receiving result 570 but before sending result acknowledgement 580, workload manager 515 can again provide result 570 to client 500 by either retrieving the stored result from persistent store 525 or by resending workload units 540*a*-540*n* to compute nodes 590*a*-590*n*. Reception of result acknowledgement 580 from client 500 before completion of the previously initiated result storage 560 obviates the need for storage of the result; consequently, workload manager 515 in this instance can abort 585 the result storage.

While various embodiments of a method and system for facilitating the exchange of information between communicating entities utilizing an asynchronous persistent store protocol according to the present disclosure have been described above, it should be understood that they have been presented by way of example only, and not limitation. Thus, the breadth and scope of the invention should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

We claim:

1. A method for information exchange in a computing environment through a manager of data in need of processing in communication with a source and target, the method comprising:
receiving by the manager a data input from the source, wherein the source expects a data output from the target based on and in response to the data input;
initiating by the manager a persistent storage of the data input received from the source;
without waiting for the initiated storage of the data input received from the source to complete, sending by the manager the data input received from the source to the target;
receiving the data output from the target;
aborting by the manager the initiated storage of the data input received from the source if, after the receiving the data output from the target, the initiated storage of the data input received from the source is not complete;
initiating by the manager a persistent storage of the data output received from the target;
without waiting for the initiated storage of the data output received from the target to complete, sending by the manager the data output received from the target to the source;
receiving by the manager an acknowledgement from the source of receipt of the data output; and
aborting by the manager the initiated storage of the data output received from the target if, after the receiving the acknowledgement from the source of receipt of the data output, the initiated storage of the data output received from the target is not complete,
upon experiencing a failure by the manager after the data output has been stored and before the data output has been received by the source, determining that the manager has recovered from the failure to retrieve the stored data output and continue the information exchange in a manner transparent to both the source and the target; and
upon experiencing a failure by the source after the source has received the data output and before the source has sent an acknowledgement, determining that the source has recovered from the failure and sending the data output, by the manager, to the source, wherein a new target may be selected to receive the data input if the manager or the source experience a failure,
wherein the manager determines targets upon receiving the data input from the source, wherein targets are not pre-determined by the source.

2. The method according to claim 1, wherein the receiving the data output from the target is performed by the manager.

3. The method according to claim 1, wherein the receiving the data output from the target is performed directly by the source, bypassing the manager.

4. The method according to claim 1, the method further comprising:
acknowledging, by the manager to the source, receipt of the data input if, after the initiating the storage of the data input received from the source, the initiated storage of the data input received from the source is complete.

5. The method according to claim 1, wherein the source is a requesting client in a message-oriented middleware environment, the target is a responding client in the message-oriented middleware environment, the data input is a request, and the data output is a response based on and in response to the request.

6. The method according to claim 1, wherein the source is a client in a distributed computing environment, the target is a compute node in the distributed computing environment, the data input is a workload unit, and the data output is a result based on and in response to the workload unit.

7. The method according to claim 1, wherein the sending by the manager the data input received from the source to the target occurs substantially simultaneously with the initiating by the manager a storage of the data input received from the source.

8. The method according to claim 1, wherein the sending by the manager the data input received from the source to the target occurs before the initiating by the manager a storage of the data input received from the source.

9. The method according to claim 1, wherein the target and the new target are located on the same computer.

10. A method for information exchange through a workload manager managing units of data in need of processing, the workload manager in communication with a client and at least one compute node in a distributed computing environment, the method comprising:
receiving by the workload manager a workload unit of data in need of processing from the client, wherein the client expects a result from the at least one compute node based on and in response to the workload unit;
initiating by the workload manager a persistent storage of the workload unit received from the client;
without waiting for the initiated storage of the workload unit received from the client to complete, sending by the workload manager the workload unit received from the client to the at least one compute node;
receiving the result from the at least one compute node;
aborting by the workload manager the initiated storage of the workload unit received from the client if, after the receiving the result from the at least one compute node, the initiated storage of the workload unit received from the client is not complete;
initiating by the workload manager a persistent storage of the result received from the at least one compute node;
without waiting for the initiated storage of the result received from the at least one compute node to complete, sending by the workload manager the result received from the at least one compute node to the client;
receiving by the workload manager an acknowledgement from the client of receipt of the result; and
aborting by the workload manager the initiated storage of the result received from the at least one compute node if, after the receiving the acknowledgement from the client of the result sent to the client, the initiated storage of the result received from the at least one compute node is not complete,
upon experiencing a failure by the workload manager after the result has been stored and before the result has been received by the client, determining that the workload manager has recovered from the failure to retrieve the stored result and continue the information exchange in a manner transparent to both the client and the at least one computer node; and upon experiencing a failure by the client after the client has received the result and before the client has sent an acknowledgement, determining that the client has recovered from the failure and sending the result, by the workload manager, to the client, wherein a new compute node may be selected to receive the workload unit if the workload manager or the client experience a failure, wherein the manager determines the at least one compute node upon receiving the workload unit from the client, wherein the at least one compute node is not pre-determined by the client.

11. The method according to claim 10, wherein the receiving the result from the at least one compute node is performed by the workload manager.

12. The method according to claim 10, wherein the receiving the result from the at least one compute node is performed directly by the client, bypassing the workload manager.

13. The method according to claim 10, the method further comprising:
acknowledging, by the workload manager to the client, receipt of the workload unit if, after the initiating the storage of the workload unit received from the client, the initiated storage of the workload unit received from the client is complete.

14. The method according to claim 10, wherein the sending by the workload manager the workload unit received from the client to the at least one compute node occurs substantially simultaneously with the initiating by the workload manager a persistent storage of the workload unit received from the client.

15. The method according to claim 10, wherein the sending by the workload manager the workload unit received from the client to the at least one compute node occurs before the initiating by the workload manager a persistent storage of the workload unit received from the client.

16. The method according to claim 10, wherein the at least one compute node and the new compute node are located on the same computer.

17. A system for information exchange across a computing environment between a source and a target, the system comprising:
a persistent store device; and
a manager of data in need of processing, the manager in communication with the persistent store device, the source, and the target, wherein the manager is configured to:
receive a data input from the source, wherein the source expects a data output from the target based on and in response to the data input,
initiate a storage in the persistent store device of the data input received from the source,
send the data input received from the source to the target without waiting for the initiated storage of the data input received from the source to complete,
receive the data output from the target,
abort the initiated storage of the data input received from the source if, after the data output is received from the target, the initiated storage of the data input received from the source is not complete, and
initiate a storage in the persistent store device of the data output received from the target,
send the data output received from the target to the source without waiting for the initiated storage of the data output received from the target to complete,
receive an acknowledgement from the source of receipt of the data output, and
abort the initiated storage of the data output received from the target if, after receiving the acknowledgement from the source of receipt of the data output, the initiated storage of the data output received from the target is not complete,
upon the source experiencing a failure by the source after the source has received the data output and before the source has sent an acknowledgment, determining that the source has recovered from the failure and sending the output by the manager to the source, wherein a new target may be selected to receive the data input if the manager or the source experience a failure; and
upon experiencing a failure by the manager after the data output has been stored and before the data output has been received by the source, determining that the manager has recovered from the failure to retrieve the stored data output and continue the information exchange in a manner transparent to both the source and the target,
wherein the manager determines targets upon receiving the data input from the source, wherein targets are not pre-determined by the source.

18. The system according to claim 17, wherein the data output is received from the target by the manager.

19. The system according to claim 17, wherein the data output is received directly from the target by the source, bypassing the manager.

20. The system according to claim 17, wherein the manager is further configured to:
acknowledge to the source receipt of the data input if, after initiating the storage of the data input received from the source, the initiated storage of the data input received from the source is complete.

21. The system according to claim 17, wherein the source is a requesting client in a message-oriented middleware environment, the target is a responding client in the message-oriented middleware environment, the manager is a message transfer agent in the message-oriented middleware environment, the data input is a request, and the data output is a response based on and in response to the request.

22. The system according to claim 17, wherein the source is a client in a distributed computing environment, the target is a compute node in the distributed computing environment, the manager is a workload manager in the distributed computing environment, the data input is a workload unit, and the data output is a result based on and in response to the workload unit.

23. The system according to claim 17, wherein the target and the new target are located on the same computer.

24. A system for information exchange between a client and at least one compute node in a distributed computing environment, the system comprising:
a persistent store device; and
a workload manager managing units of data in need of processing, the workload manager in communication with the persistent store device, the client, and the at least one compute node, wherein the workload manager is configured to:
receive a workload unit of data in need of processing from the client, wherein the client expects a result from the at least one compute node based on and in response to the workload unit,
initiate a storage in the persistent store device of the workload unit received from the client, send the workload unit received from the client to the at least one compute node without waiting for the initiated storage of the workload unit received from the client to complete, receive the result from the at least one compute node, and abort the initiated storage of the workload unit received from the client if, after the result is received from the at least one compute node, the initiated storage of the workload unit received from the client is not complete, and initiate a storage in the persistent store device of the result received from the at least one compute node, send the result received from the at least one compute node to the client without waiting for the initiated storage of the result received from the at least one compute node to complete, receive an acknowledgement from the client of receipt of the result, and abort the initiated storage of the result received from the at least one compute node if, after receiving the acknowledgement from the client of receipt of the result, the initiated storage of the result received from the at least one compute node is not complete, upon the client experiencing a failure after the client has received the result and before the client has sent an acknowledgment determining that the client has recovered from the failure and sending the result, by the workload manager, to the client, wherein a new compute node may be selected to receive the workload unit if the workload manager or the client experience a failure; and upon experiencing a failure by the workload manager after the result has been stored and before the result has been received by the client, determining that the workload manager has recovered from the failure to retrieve the stored result and continue the information exchange in a manner transparent to both the client and the at least one computer node, wherein the manager determines the at least one compute node upon receiving the workload unit from the client, wherein the at least one compute node is not pre-determined by the client.

25. The system according to claim 24, wherein the result is received from the at least one compute node by the workload manager.

26. The system according to claim 24, wherein the result is received directly from the at least one compute node by the client, bypassing the workload manager.

27. The system according to claim 24, wherein the workload manager is further configured to acknowledge to the client receipt of the workload unit if, after initiating the storage of the workload unit received from the client, the initiated storage of the workload unit received from the client is complete.

28. The system according to claim 24, wherein the at least one compute node and the new compute node are located on the same computer.

* * * * *